(12) United States Patent
Wasilewska et al.

(10) Patent No.: US 10,994,691 B2
(45) Date of Patent: May 4, 2021

(54) AIRBAG

(71) Applicant: AUTOLIV DEVELOPMENT AB, Vargarda (SE)

(72) Inventors: Malgorzata Wasilewska, Lubsza (PL); Maciej Matynski, Olawa (PL); Magdalena Petecka, Jelenia Gora (PL); Siecla Przemyslaw, Rawicz (PL)

(73) Assignee: AUTOLIV DEVELOPMENT AB, Vargarda (SE)

( * ) Notice: Subject to any disclaimer, the term of this patent is extended or adjusted under 35 U.S.C. 154(b) by 13 days.

(21) Appl. No.: 16/340,232

(22) PCT Filed: Sep. 14, 2017

(86) PCT No.: PCT/EP2017/073121
§ 371 (c)(1),
(2) Date: Apr. 8, 2019

(87) PCT Pub. No.: WO2018/068981
PCT Pub. Date: Apr. 19, 2018

(65) Prior Publication Data
US 2020/0047702 A1 Feb. 13, 2020

(30) Foreign Application Priority Data

Oct. 14, 2016 (DE) ............ 10 2016 119 613.4

(51) Int. Cl.
B60R 21/233 (2006.01)
B60R 21/2338 (2011.01)
B60R 21/231 (2011.01)

(52) U.S. Cl.
CPC ........ B60R 21/233 (2013.01); B60R 21/2338 (2013.01); B60R 2021/23169 (2013.01); B60R 2021/23308 (2013.01)

(58) Field of Classification Search
CPC .......... B60R 2021/23169; B60R 2021/23308; B60R 21/233; B60R 2021/2338
(Continued)

(56) References Cited

U.S. PATENT DOCUMENTS 7,347,444 B2 3/2008 Wheelwright
7,891,700 B2 2/2011 Ishida
(Continued)

FOREIGN PATENT DOCUMENTS

DE 10 2010 108 180 A1 10/2011
DE 102016001455 A1 * 8/2017 ........... B60R 21/206
(Continued)

OTHER PUBLICATIONS

International Search Report and Written Opinion of PCT/EP2017/073121 dated Oct. 30, 2017.

Primary Examiner — James A Shriver, II
Assistant Examiner — Hilary L Johns
(74) Attorney, Agent, or Firm — Dickinson Wright PLLC

(57) ABSTRACT

An airbag having an outer skin enclosing a gas space. The outer skin has a first side wall (11) and a second side wall (12). The first side wall (11) and second side wall (12) are connected to one another at a first end (71), the first side wall (11) extends from the first end (71) to a second end (72), the second side wall (12) extends from the first end (71) to a third end (73), a third side wall (23) extends from the second end (72) of the first side wall (11) to a fourth end (74), and a fourth side (24) wall extends from the fourth end (74) to the third end (73) of the second side wall (12). The third side wall (23) is separate from the first side wall (11) and extends from a fifth end (75) connected to at least a portion of the second end (72) of the first side wall (11) by a first seam (81). The fourth side wall (24) is separate from the second side wall (12) and extends from a sixth end (76) connected to at
(Continued)

least a portion of the third end (73) of the second side wall (12) by a second seam (82).

11 Claims, 5 Drawing Sheets

(58) Field of Classification Search
USPC .................................................. 280/728.1
See application file for complete search history.

(56) References Cited

U.S. PATENT DOCUMENTS

| | | | |
|---|---|---|---|
| 8,272,667 B2 | 9/2012 | Schneider et al. | |
| 8,297,649 B2 | 10/2012 | Enders | |
| 8,641,085 B2 * | 2/2014 | Przybysz | B60R 21/206 |
| | | | 280/729 |
| 8,696,020 B2 | 4/2014 | Tanaka | |
| 9,669,793 B2 | 6/2017 | Jung et al. | |
| 10,351,091 B2 * | 7/2019 | Abe | B60R 21/2334 |
| 2002/0149187 A1 * | 10/2002 | Holtz | B60R 21/206 |
| | | | 280/749 |
| 2005/0248132 A1 * | 11/2005 | Wheelwright | B60R 21/23138 |
| | | | 280/729 |
| 2009/0302585 A1 * | 12/2009 | Ishida | B60R 21/2032 |
| | | | 280/730.1 |
| 2011/0012327 A1 * | 1/2011 | Enders | B60R 21/2334 |
| | | | 280/730.1 |
| 2011/0101660 A1 * | 5/2011 | Schneider | B60R 21/206 |
| | | | 280/731 |
| 2011/0109070 A1 * | 5/2011 | Tanaka | B60R 21/2334 |
| | | | 280/741 |
| 2012/0025498 A1 * | 2/2012 | Tanaka | B60R 21/235 |
| | | | 280/730.2 |
| 2015/0197210 A1 * | 7/2015 | Abe | B60R 21/233 |
| | | | 280/729 |
| 2016/0046253 A1 * | 2/2016 | Jung | B60R 21/231 |
| | | | 280/729 |
| 2016/0052476 A1 * | 2/2016 | Jindal | B60R 21/231 |
| | | | 280/729 |
| 2016/0244016 A1 * | 8/2016 | Takeshita | B60R 21/231 |
| 2016/0288758 A1 * | 10/2016 | Ando | B60R 21/231 |
| 2017/0057447 A1 * | 3/2017 | Ando | B60R 21/233 |

FOREIGN PATENT DOCUMENTS

| | | | | |
|---|---|---|---|---|
| EP | | 3594070 A1 * | 1/2020 | ........... B60R 21/015 |
| EP | | 3594072 A1 * | 1/2020 | ....... B60R 21/01512 |
| WO | WO 2014/163337 A1 | | 10/2014 | |
| WO | WO-2014163337 A1 * | | 10/2014 | ........... B60R 21/231 |

* cited by examiner

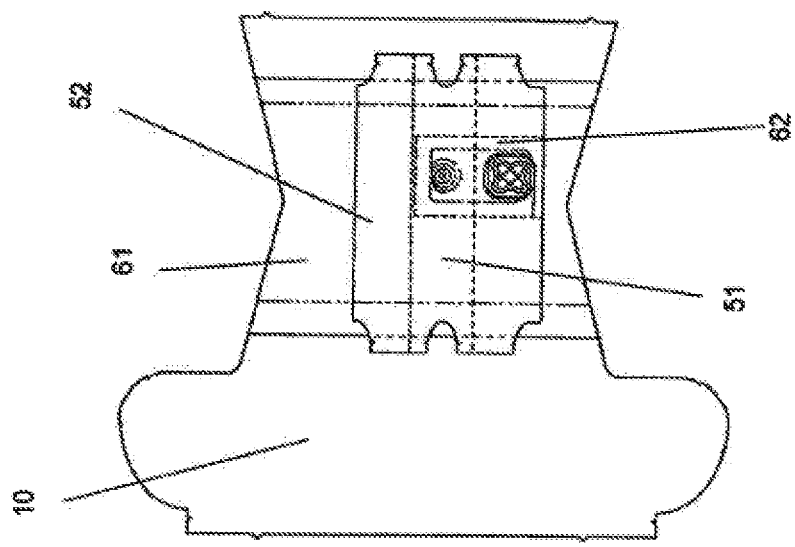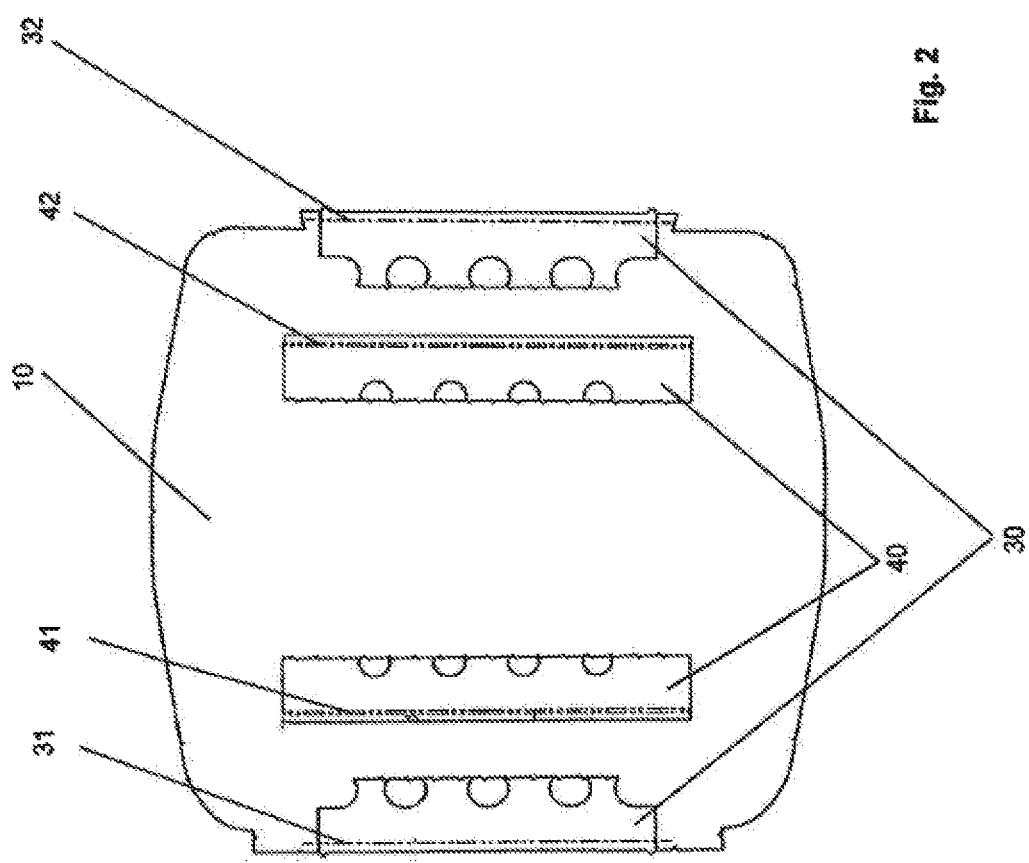
Fig. 2

AIRBAG

CROSS-REFERENCE TO RELATED APPLICATIONS

This application is a 35 U.S.C. § 371 national phase of PCT International Application No. PCT/EP2017/073121, filed Sep. 14, 2017, which claims the benefit of priority under 35 U.S.C. § 119 to German Patent Application No. 10 2016 119 613.4, filed Oct. 14, 2016, the contents of which are incorporated herein by reference in their entirety.

FIELD OF THE INVENTION

The invention relates to a motor vehicle.

BACKGROUND

Especially in the field of so-called knee airbags, but also in the field of other types of airbags such as side impact airbags, airbags are known which have a basically L-shaped cross section when they are in their deployed state. Usually one leg of the L defines a main chamber (serving for the protection of a body part of the occupant), whereas the other leg of the L defines a filling and/or support chamber.

A generic airbag (which is a knee airbag) is known from WO2014/16337 A1. The outer skin of this airbag is formed of first side wall and a second side wall basically enclosing a main chamber, and a third side wall and a fourth side wall basically enclosing a filling and support chamber.

Within the definitions chosen in this application the first side wall and the second side wall are connected to one another at a first end and the first side wall extends from the first end to the second end and the second side wall extends from the first end to a third end. The distance between the first end and the second end exceeds the distance between the first end and the third end. The third side wall extends from the second end of the first side wall to a fourth end and the fourth side wall extends from this fourth end to the third end of the second side wall. The outer skin of this airbag is made from a single cutting.

It is the task of this invention to provide an airbag which has a similar structure as the one of WO 2016/16337A1, but can be manufactured more easily.

This task is solved by an airbag with the features of embodiments of the present invention.

SUMMARY

According to the present invention, the third side wall is separate from the first side wall and the fourth side wall is separate from the second side wall. It is especially preferred that the first side wall and the second side wall are made from a single cutting and that the third side wall and the fourth side wall are also made from a single cutting (but separate from the single cutting of the first and the second side wall). The third side wall extends from a fifth end being connected to the second end of the first side wall and is connected to the same by a first seam. Similarly the fourth side wall extends from a sixth end which is connected to the third end of the second side wall by a second seam. As will be seen later with reference to the preferred embodiment the sewing process of such a structure is rather simple.

It is especially preferred that a tether extends between the first seam and the second seam through the gas space such that it divides the same into a first chamber (usually a main chamber) and a second chamber (usually a filling and support chamber). The presence of such a tether enhances the desired structure. Additionally the sewing process necessary for attaching this tether to the outer skin of the airbag easily to conduct.

In another preferred embodiment the third side wall forms an additional fold similar to the generic airbag.

Further preferred embodiments are defined in the following description and appended claims.

BRIEF SUMMARY OF THE DRAWINGS

Embodiments of the invention will now be explained in detail view of the drawings.

The drawings show:

FIG. 2 illustrates the items shown in FIG. 1 after a first set of sewing processes.

DETAILED DESCRIPTION

The invention will now be described by a preferred embodiment.

In the described embodiment all seams are seams in the natural sense of this term (meaning seams that are sewn by use of at least one thread), but it needs to be mentioned that it is basically possible to replace at least some of the seams by other kind of connections, such as glued connections or welded connections. But for the sake of linguistic simplicity the term "seam" is exclusively used within this application.

Further, all cuttings from which the airbag is sewn are usually made from a woven polymeric material, but it might also be possible to manufacture at least some of the cuttings from another flat, flexible material.

Figure 1:
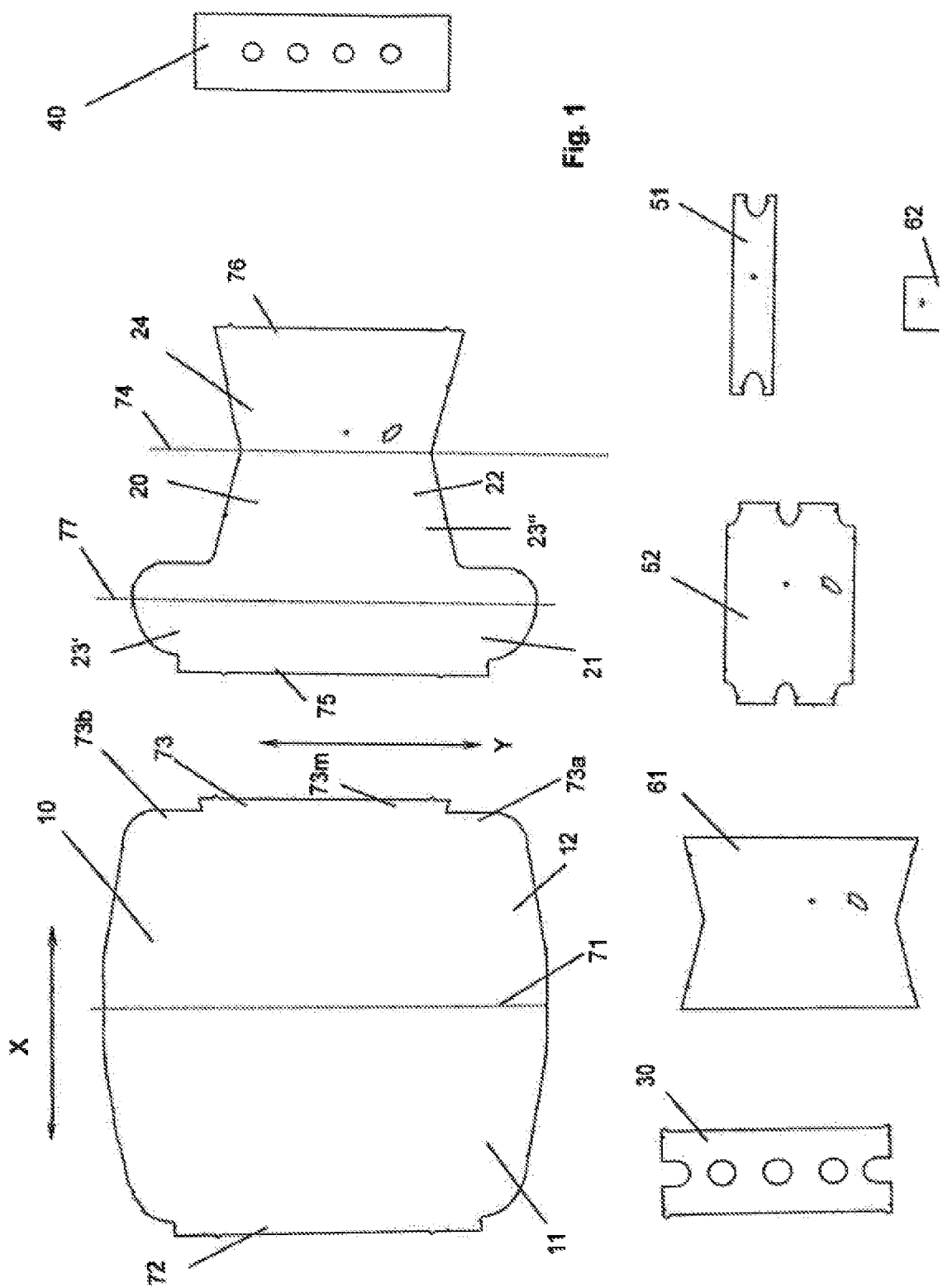
FIG. 1 shows all cuttings of the described embodiment of the airbag.

FIG. 1 shows all items of the airbag. These items are: A first cutting 10, a second cutting 20, a tether 30, an additional tether 40, a first deflector element 51, a second deflector element 52, a first enforcement layer 61 and a second enforcement layer 62.

All cuttings (including the tethers, the deflector elements and the enforcement layers) extend in a first direction X (longitudinal direction) and a second direction Y (lateral direction). After the assembly process is finished the first cutting 10 forms the first side wall 11 and the second side wall 12 and the second cutting 20 forms the third side wall 23 and the fourth side wall 24 of the airbag. The positions of these side walls as well as the positions of folding lines (although not yet present in the state of FIG. 1) are shown in FIG. 1 for the sake of a better understanding.

As will be seen later, the first side wall 11 and the second side wall 20 extend from a first end which is in form of a fold 71. Similarly the third side wall 23 and the fourth side wall 24 extend from a fourth end which is also in form of a fold 74. Since the term "first end" is used for a just mentioned fold and the fourth end is also used for an above mentioned fold, the following definitions are chosen: The first cutting 10 extends in the first (X) direction from a second end 72 to a third end 73 and the second cutting 20 extends from a fifth end 75 to a sixth end 76.

The first cutting 10 is basically rectangular, but the third end 73 forms two side portions 73a, 73b and a middle portion 73m extending from those side portions 73a, 73b in X-direction.

The second cutting has a non-uniform width (in the Y-direction) such that it is basically mushroom-shaped with a head 21 and a foot 22. The fifth end 75 is a part of the head 21 and in the folded and assembled state of the airbag an additional fold 77 extends in Y-direction through the head 21 and divides the third side wall 23 into a first section 23' extending from the fifth end 75 and a second section 23" extending between this first section 23' and the fourth side wall 24. The second section 23' has a head part and a foot part.

The second cutting 20, the first deflector element 51, the second deflector element 52, the first enforcement layer 61 and the second enforcement layer 62 all have a small hole. In the finally assembled state all these small holes are aligned to each other. In a complete airbag unit (including a gas generator or other type of inflator) an inflator stud extends through these small holes. Additionally the second cutting 20, the second deflector element 52, the first enforcement layer 61 and the second enforcement layer 62 form a larger hole. In the finally assembled state these larger holes are also aligned with each other and serve for inserting the above mentioned inflator. The tether 30 and the additional tether 40 form holes through which inflation gas can flow.

FIG. 2 shows the items of FIG. 1 after completion of a first series of sewing processes. One end of the tether 30 is sewn to the second end 72 of the first cutting 10 by a first tether seam 31 such that this end of the tether 30 is parallel orientated to the second end 73. In the same way the other end of the tether 30 is sewn to the middle portion 73m of the third end 73 of the first cutting 10 by a second tether seam 32. The additional tether 40 is sewn to the first cutting 10 by the first additional tether seam 41 and a second additional tether seam 42.

The first enforcement layer 61, the second enforcement layer 62, the first deflector element 51 and the second deflector element 52 are sewn to the second cutting 20.

Figure 3:
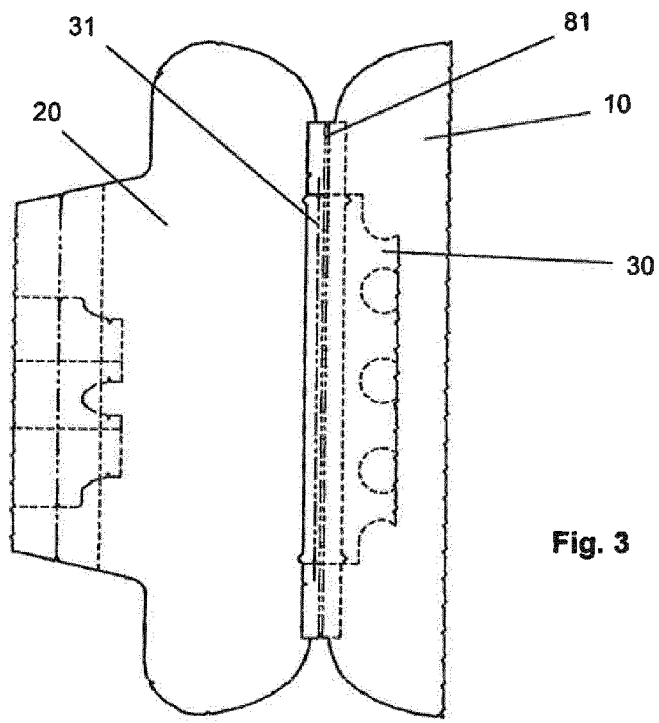
FIG. 3 shows the items shown in FIG. 2 after a next sewing process.

FIG. 3 shows the situation after completion of the next production step. Here, the second end 72 of the first cutting 10 is sewn to the fifth end and 75 of the second cutting 20 by a first seam 81. The tether 30 is placed between the first cutting 10 and the second cutting 20 and the second end 72 of the first cutting and the fifth end 75 of the second cutting 20 are anti-parallel orientated. That means that the edge of the second end 72 of the first cutting 10 and the edge of the fifth end 75 of the second cutting 20 point into opposite directions as can also be seen from FIG. 5.

In the next step, the first cutting 10 and the second cutting 20 are folded such that the sixth end 76 of the second cutting is placed onto the middle portion 73m of the third end 73 of the second cutting with the end of the tether 30 which is attached to the third end 73 by the second tether seam 32 being placed between the middle portion of the third end 73 and the sixth end 76. The middle portion 73m of the third end 73, the end of the tether 30 and the sixth end 76 are parallel orientated meaning their edges all show into the same direction. In this stage the second seam 82 is applied. By the folding process prior to this sewing three folds are established, namely a fold forming the first end 71, a fold forming the fourth end 74 and an additional fold 77. The fold of the first end 71 extends in Y-direction through the first cutting 10 and separates the first side wall 11 from the second side wall 12. The fold of the fourth end 74 extends in Y-direction through the second cutting 20 and separates the third side wall 23 from the fourth side wall 24. The additional fold 77 extends parallel to the fold of the fourth end 74 and extends through the third side wall 23. This additional fold 77 points towards the first end 71 of the airbag.

Now two first closing seams 91 and 92 are applied. Both first closing seams 91, 92 can be looked at as being includes two sections, namely a first section 91a, 92a and a second section 91b, 92b. These two sections connect different parts of the outer skin of the airbag, as will now be described in view of the first closing seam 91 (the other first closing seam 92 is symmetrical to this): The first section 91a of the first closing seam connects a lateral side of the fourth side wall 24 to a lateral side of the foot part of the second section 23" of the third side wall 23. A second section 91b of the first closing seam connects a lateral side of the head part of the second section 23" of the third side wall 23 to a side portion 73a of the third end of the second side wall. In a transition point between the first section 91a and the second section 91b the second side wall 32, the fourth side wall 24 and the third side wall 23 are connected to each other by this first closing seam.

Finally the second closing seams 93 and 94 are applied. Since these are also symmetrical, reference is only made to one of these second closing seams, namely second closing seam 93. This second closing seam 93 can also be looked at as being formed of a first section 93a and a second section 93b. The first section 93a connects a lateral side of the first section 23' of the third side wall 23 to a lateral side of a section of the first side wall 21 and the second section 93b of the second closing seam 93 connects the remaining section of the first side wall 11 and the second side wall 12 at a lateral side. In a transition point of the second closing seam 92 the first, second and third walls are connected to one another.

Figure 4:
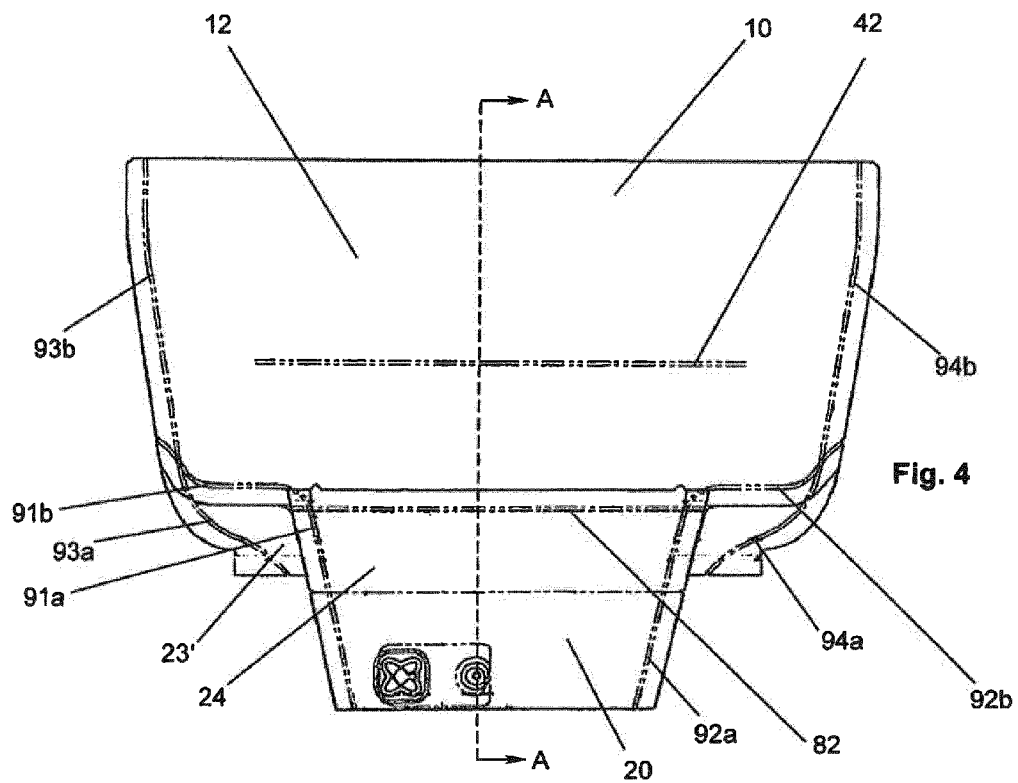
FIG. 4 illustrates the completely manufactured airbag.
Figure 5:
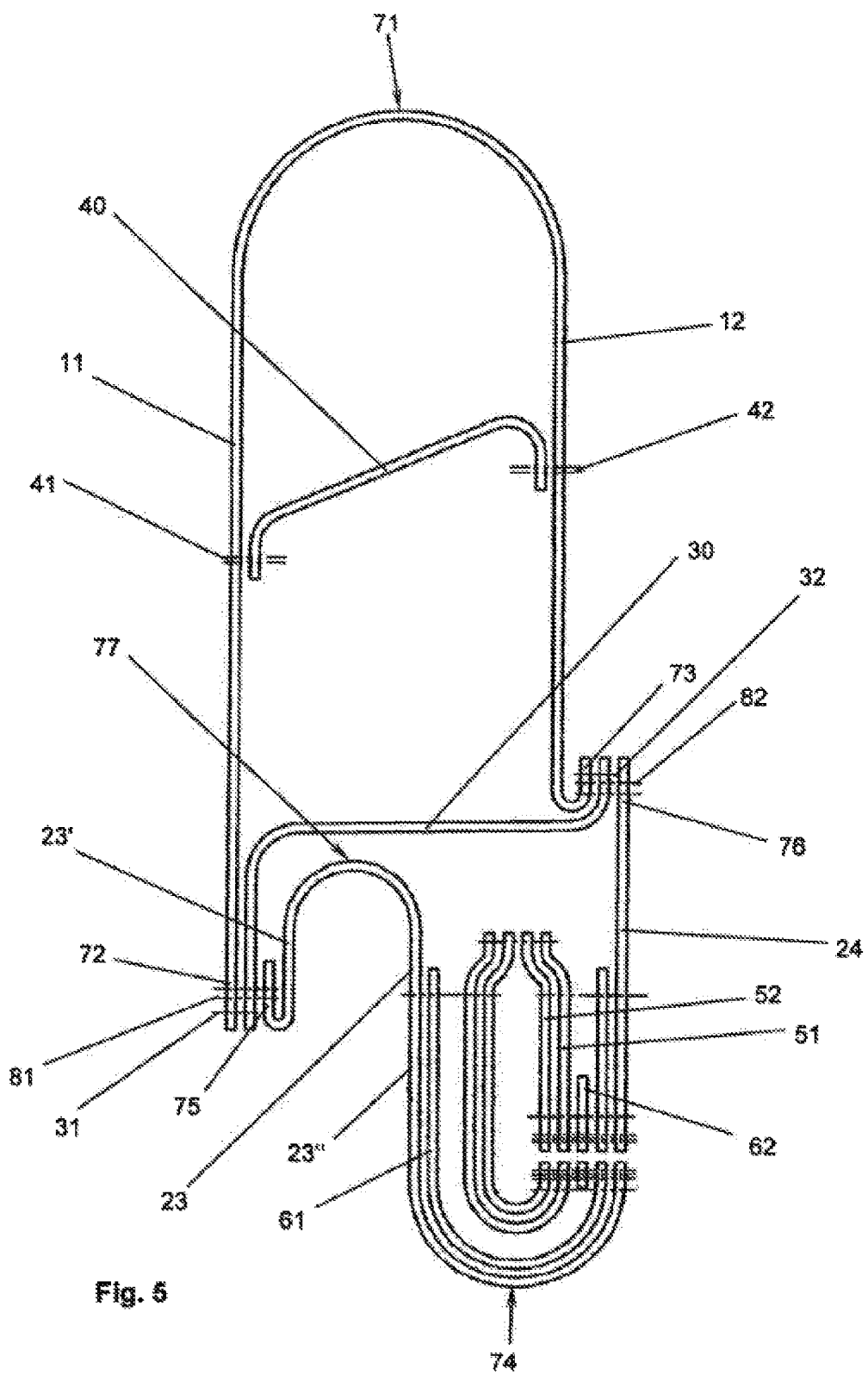
FIG. 5 is a sectional view taken along line A-A in FIG. 4.

FIGS. 4 and 5 show the completely assembled airbag in its non-deployed flat state, but it need to be mentioned that FIG. 5 (being a sectional view taken along plane A-A in FIG. 4) is diagrammatic in order to show the structure more clearly. Due to this the folds 71, 74 and 77 are shown with a rather large diameter although in reality they are sharp folds as long as the airbag is folded.

Figure 6:
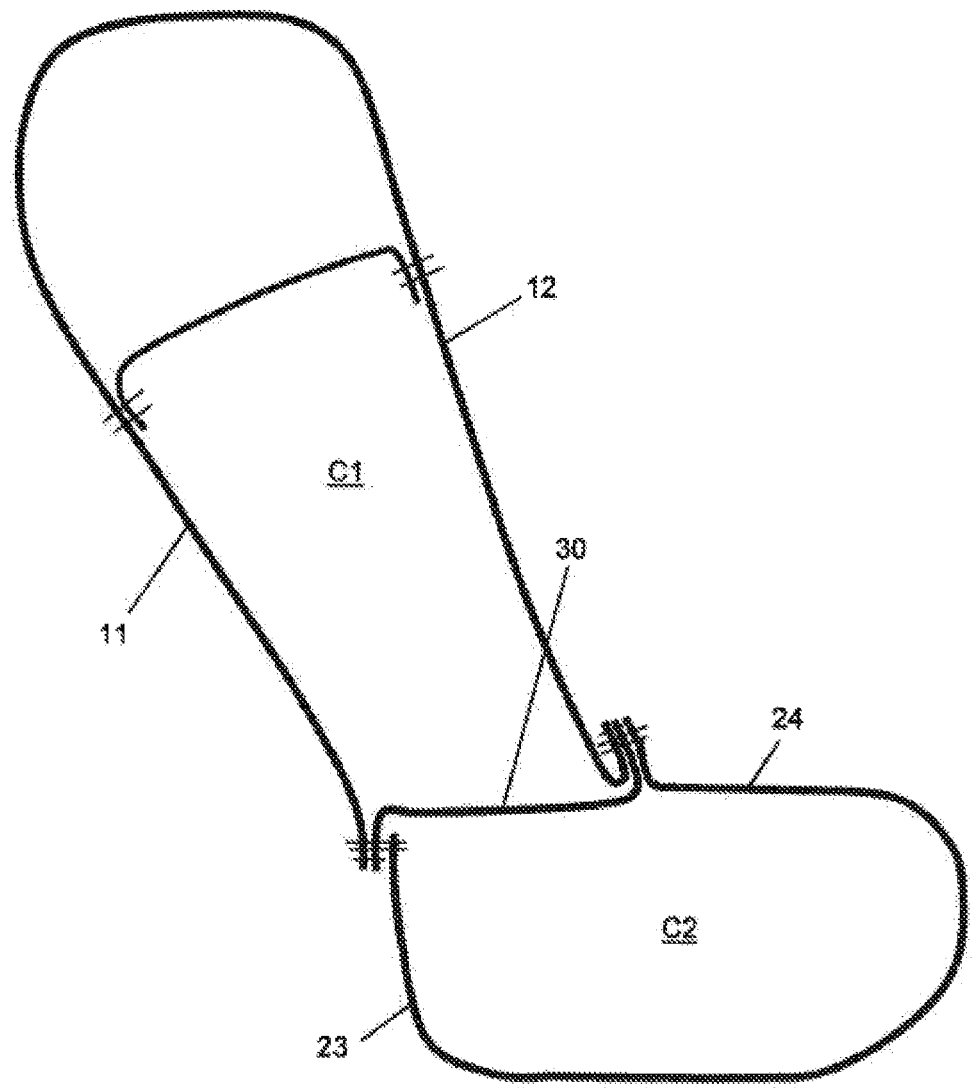
FIG. 6 shows basically what is shown in FIG. 5 when the airbag is in a deployed state.

FIG. 6 shows (also strongly schematic) the airbag of FIG. 5 but in a fully deployed state, but with the enforcement and deflector elements not shown. One can see that the airbag has a basically L-shaped cross-section with the first and the second side wall 31, 32 enclosing a first (main) chamber C1 and the third and the fourth side wall 23, 24 enclosing a second (filling and support) chamber C2. The two chambers are divided by the tether 30.

The airbag described is a knee airbag. This is a very important application of this invention, but it needs to be mentioned that the inventive concept could also be applied to other types of airbags, especially side airbags.

While the above description constitutes the preferred embodiment of the present invention, it will be appreciated that the invention is susceptible to modification, variation and change without departing from the proper scope and fair meaning of the accompanying claims.

The invention claimed is:

1. An airbag having an outer skin enclosing a gas space, the outer skin comprising:
  a first side wall and a second side wall, wherein the first side wall and the second side wall are connected to one another at a first end,
  the first side wall extends from the first end to a second end, the second wall extends from the first end to a third end, a third side wall extending from the second end of the first side wall to a fourth end, and a fourth side wall extending from the fourth end to the third end of the second side wall, the third side wall is separate from the first side wall, the third side wall extending from a fifth end being connected to at least a portion of the second end of the first side wall by a first seam, and the fourth side wall is separate from the second side wall, the fourth side wall extending from a sixth end being connected to at least a portion of the third end of the second side wall by a second seam, wherein two first closing seams each have a first section connecting the third side wall and the fourth side wall, and a second section connecting the third side wall and the second side wall such that, in the second section of the first closing seams, the third side wall is directly attached to the second side wall.

2. The airbag of claim 1 further comprising, a tether extending between the first seam and the second seam through the gas space and divides the gas space into a first chamber and a second chamber.

3. The airbag of claim 1 further comprising, the first side wall and the second side wall are made from a first single cutting such that the first end forms a fold when the airbag is in an un-deployed state.

4. The airbag of claim 1 further comprising, the third side wall and the fourth side wall are made from a second single cutting such that the fourth end forms a fold when the airbag is in an un-deployed state.

5. The airbag of claim 1 further comprising, a deflector connected to the third side wall and the fourth side wall.

6. The airbag of claim 1 further comprising, at least one additional tether extending between the first side wall and the second side wall.

7. The airbag of claim 1 further comprising, the third side wall comprises an additional fold pointing towards the first end when the airbag is in an un-deployed state.

8. The airbag of claim 1 further comprising, two second closing seams, each having a first section connecting the third side wall and the first side wall and a second section connecting the first side wall and the second side wall.

9. The airbag of claim 1 further comprising, widths of the first and second side walls exceed a width of the fourth side wall.

10. The airbag of claim 1 further comprising, a distance between the first end and the second end exceeds a distance between the first end and the third end.

11. The airbag of claim 1 further comprising, the airbag in a deployed state has a L-shaped cross-section.

* * * * *